United States Patent
Saito et al.

(10) Patent No.: US 11,780,018 B2
(45) Date of Patent: Oct. 10, 2023

(54) ROTARY CUTTING TOOL

(71) Applicant: UNION TOOL CO., Tokyo (JP)

(72) Inventors: Hironobu Saito, Tokyo (JP); Hideki Osaki, Tokyo (JP); Hidehito Watanabe, Tokyo (JP)

(73) Assignee: UNION TOOL CO., Tokyo (JP)

( * ) Notice: Subject to any disclaimer, the term of this patent is extended or adjusted under 35 U.S.C. 154(b) by 58 days.

(21) Appl. No.: 17/134,766

(22) Filed: Dec. 28, 2020

(65) Prior Publication Data

US 2021/0213545 A1    Jul. 15, 2021

(30) Foreign Application Priority Data

Jan. 10, 2020  (JP) ................................. 2020-002789

(51) Int. Cl.
  *B23C 5/06*   (2006.01)
  *B23C 5/10*   (2006.01)
(52) U.S. Cl.
  CPC .............. *B23C 5/06* (2013.01); *B23C 5/1009* (2013.01); *B23C 2200/08* (2013.01); *B23C 2226/31* (2013.01); *B23C 2228/10* (2013.01)
(58) Field of Classification Search
  CPC ....... B23C 5/1009; B23C 5/1036; B23C 5/06; B23C 2210/0414; B23C 2210/0442; B23C 2228/10; B23C 2226/31; B23C 2226/315
  See application file for complete search history.

(56) References Cited

U.S. PATENT DOCUMENTS

| | | | | |
|---|---|---|---|---|
| 5,232,320 A | * | 8/1993 | Tank ....................... | B23B 51/00 408/145 |
| 5,379,853 A | * | 1/1995 | Lockwood .......... | E21B 10/5673 175/428 |
| 5,632,576 A | * | 5/1997 | Storch ................... | B23C 5/1036 407/62 |
| 6,082,936 A | * | 7/2000 | Moriguchi ............ | B23B 27/145 407/120 |

(Continued)

FOREIGN PATENT DOCUMENTS

| | | | | |
|---|---|---|---|---|
| DE | 10 2011 076 584 A1 | 11/2012 | | |
| EP | 560253 A1 | * | 9/1993 | ............. B23B 51/00 |

(Continued)

OTHER PUBLICATIONS

Machine Translation of IDS provided reference JP2018-008363 A, pp. 5-10 (Year: 2022).*

(Continued)

*Primary Examiner* — Nicole N Ramos
(74) *Attorney, Agent, or Firm* — Sughrue Mion, PLLC

(57) ABSTRACT

It is an object of the present invention to provide a rotary cutting tool that can divide chips at an appropriate size, suppress the incidence of edge chipping and damage attributed to chips to the cutting tool and a workpiece, extend the tool service life with regard to the machining of hard, brittle materials, and improve machining efficiency. The rotary cutting tool includes a hard coat film 3 coated onto a tip end section of a tool body 1 having a chip discharge groove 2. A rake face 6 is concavely provided in a cutting edge-side chip discharge groove formation surface 4 constituting the chip discharge groove 2 of the tool body 1, from a cutting edge 5 and along the cutting edge 5.

24 Claims, 15 Drawing Sheets

(56) References Cited

U.S. PATENT DOCUMENTS

| | | | | |
|---|---|---|---|---|
| 7,575,401 | B1* | 8/2009 | Garrick | B23B 51/108 |
| | | | | 408/230 |
| 7,695,222 | B2* | 4/2010 | Omori | C23C 30/005 |
| | | | | 407/119 |
| 8,845,241 | B2* | 9/2014 | Abe | B23C 5/109 |
| | | | | 407/54 |
| 9,815,127 | B2* | 11/2017 | Matsumoto | B23C 5/1009 |
| 9,868,160 | B2* | 1/2018 | Osaki | B23C 5/1009 |
| 10,882,117 | B2* | 1/2021 | Kobayashi | B23B 27/14 |
| 2003/0198525 | A1* | 10/2003 | Iwamoto | B23C 5/1009 |
| | | | | 407/54 |
| 2017/0072474 | A1* | 3/2017 | Minami | B27B 33/02 |
| 2018/0290219 | A1 | 10/2018 | Hufschmied | |
| 2019/0201990 | A1 | 7/2019 | Xu et al. | |
| 2019/0344355 | A1* | 11/2019 | Kobayashi | B23B 27/146 |
| 2020/0070258 | A1* | 3/2020 | Kress | B23C 5/10 |
| 2020/0261985 | A1* | 8/2020 | Kubo | C23C 16/279 |

FOREIGN PATENT DOCUMENTS

| | | | | |
|---|---|---|---|---|
| EP | 2 832 483 | A1 | 2/2015 | |
| EP | 2 868 413 | A1 | 5/2015 | |
| JP | 60-44203 | A | 3/1985 | |
| JP | 6-335806 | A | 12/1994 | |
| JP | 8-99201 | A | 4/1996 | |
| JP | 2005-103658 | A | 4/2005 | |
| JP | 2009-285760 | A | 12/2009 | |
| JP | 2014188611 | A * | 10/2014 | |
| JP | 5764181 | B2 | 8/2015 | |
| JP | 2018-008363 | A | 1/2018 | |
| JP | 2018-103338 | A | 7/2018 | |
| KR | 10-2016-0015850 | A | 2/2016 | |
| TW | 201601862 | A | 1/2016 | |
| WO | WO-2018003272 | A1 * | 1/2018 | B23B 27/00 |
| WO | WO-2018187446 | A1 * | 10/2018 | B23C 5/00 |
| WO | 2019/065949 | A1 | 4/2019 | |

OTHER PUBLICATIONS

Extended European Search Report dated May 26, 2021 in European Application No. 20216740.9.
Communication dated Dec. 2, 2021 from the Japanese Patent office in Application No. 2020-002789.
Notice of Reasons for Refusal dated Mar. 31, 2022 from the Japanese Patent Office in JP Application No. 2020-002789.
Office Action dated Jan. 18, 2022 from the Taiwanese Intellectual Property Office in TW Application No. 109133048.
Office Action dated Nov. 12, 2022 issued by the Korean Patent Office in Korean Application No. 10-2020-0152758.

* cited by examiner

FIG.4
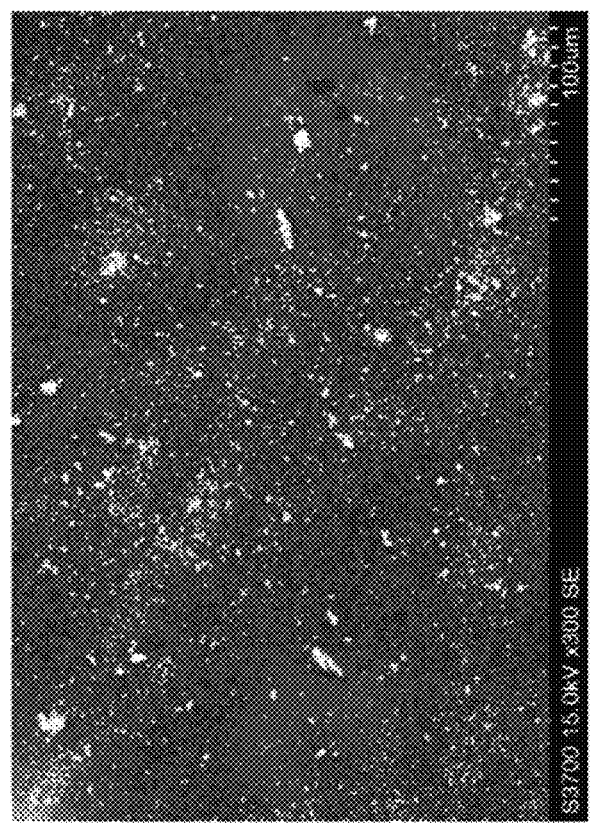
CONVENTIONAL PRODUCT
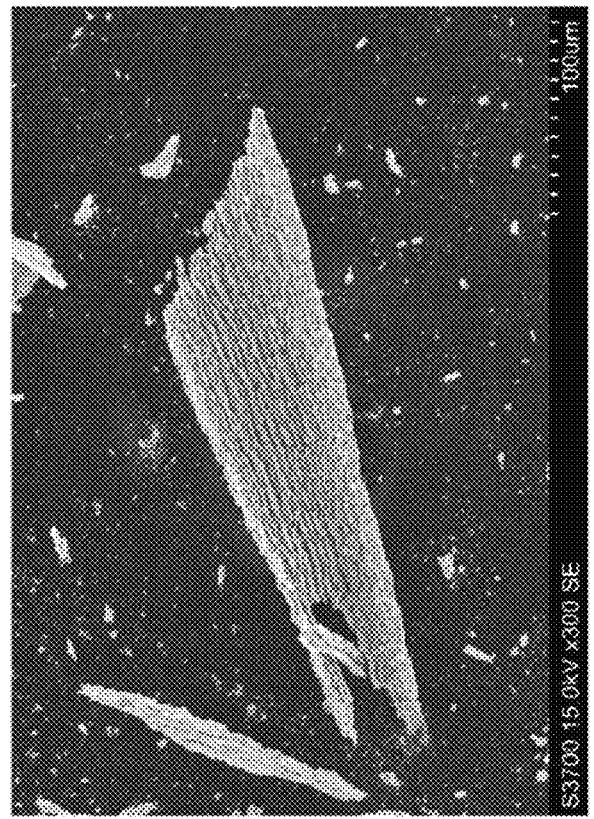
PRESENT EXAMPLE

FIG. 5 (a)
FIG. 5 (b)
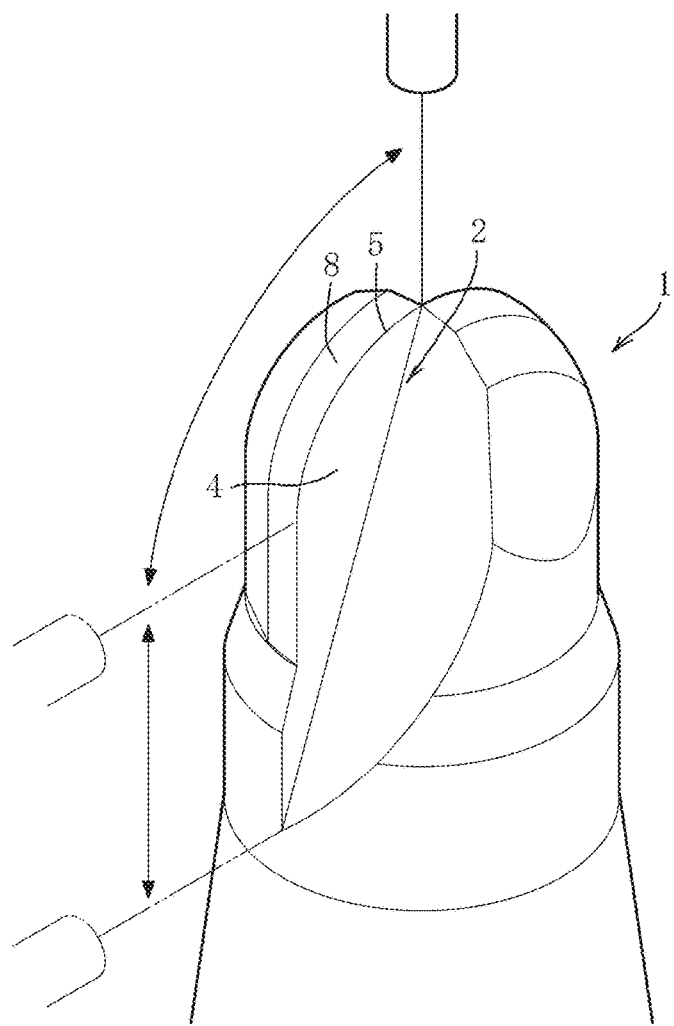
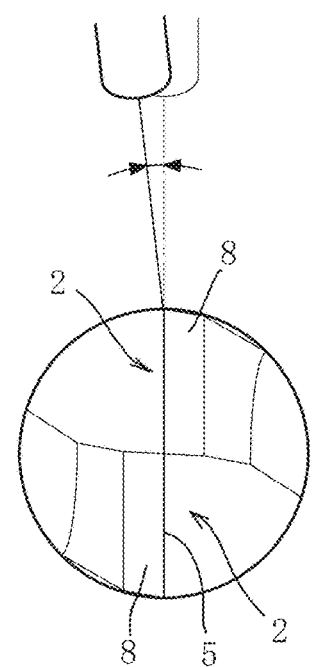

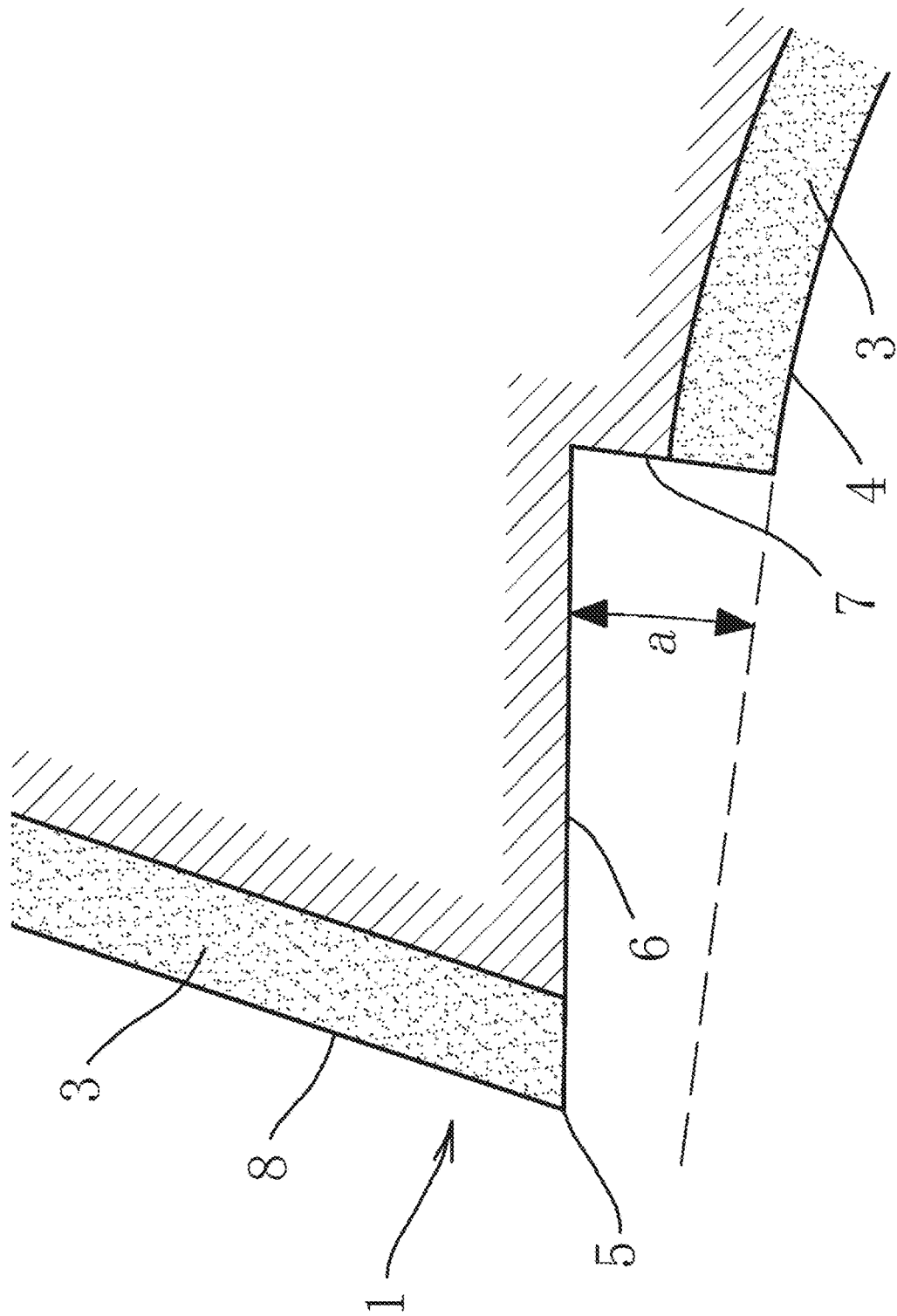

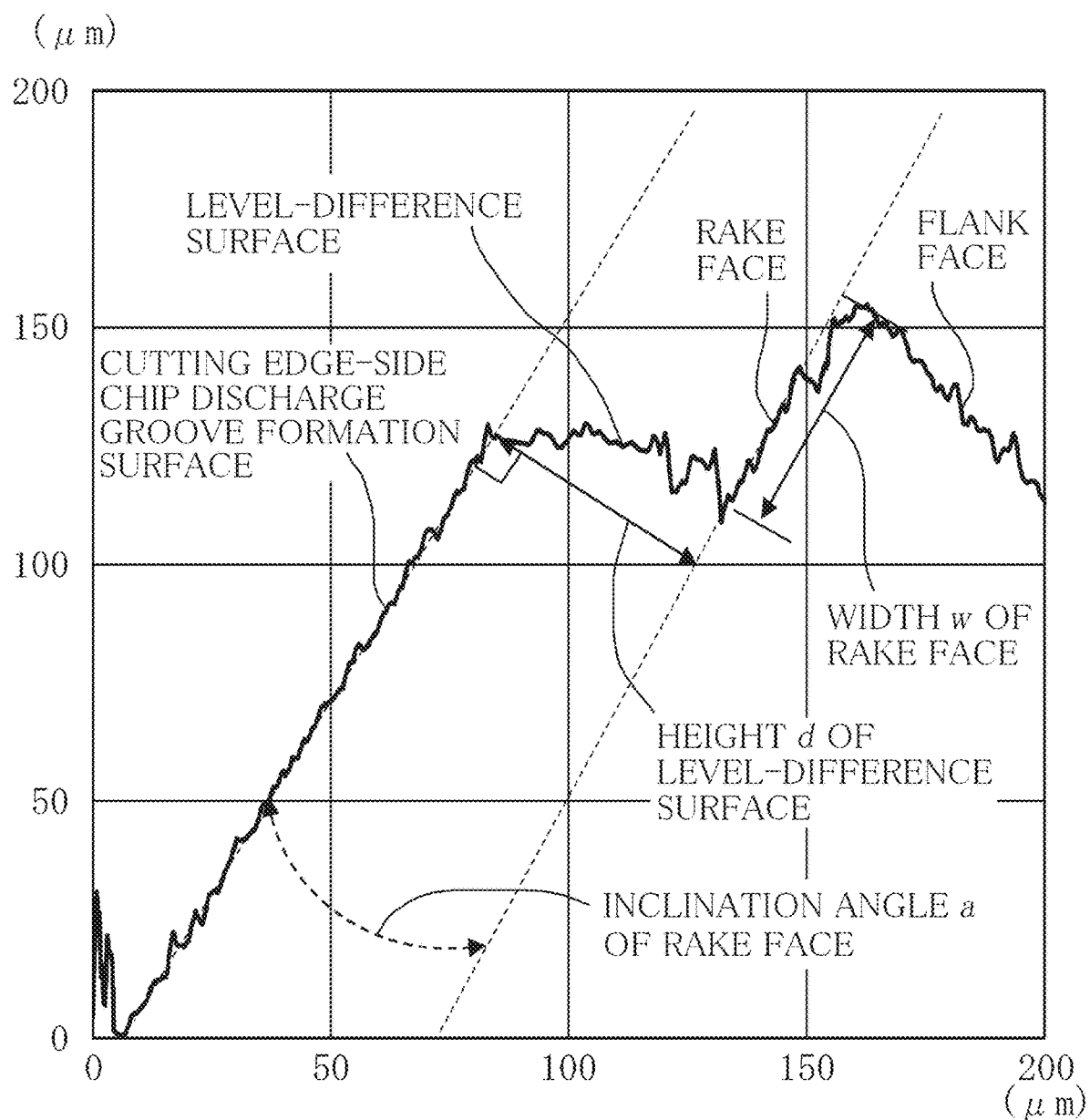

FIG. 10A

| Test No. | $d$ ($\mu m$) | $a$ (°) | $h'$ ($\mu m$) | $d/h'$ | $w$ ($\mu m$) | Machining Pocket Quantity | Machining Pocket Quantity Ratio | Machining Pocket Quantity Evaluation | Edge Chipping Evaluation | Judgment |
|---|---|---|---|---|---|---|---|---|---|---|
| 1 (Conventional Product) | 0 | 0 | 19 | 0.0 | 0 | 8 | 1.0 | — | × | × |
| 2 (Present Example) | 10 | 3 | 19 | 0.5 | 80 | 29 | 3.6 | ○ | ○ | ○ |
| 3 (Present Example) | 30 | 3 | 19 | 1.6 | 80 | 62 | 7.8 | ◎ | ◎ | ◎ |
| 4 (Present Example) | 50 | 0 | 19 | 2.6 | 80 | 50 | 6.3 | ◎ | ◎ | ◎ |
| 5 (Present Example) | 50 | 3 | 19 | 2.6 | 80 | 88 | 11.0 | ◎ | ◎ | ◎ |
| 6 (Present Example) | 50 | 5 | 19 | 2.6 | 80 | 78 | 9.8 | ◎ | ◎ | ◎ |
| 7 (Present Example) | 100 | 3 | 19 | 5.3 | 80 | 46 | 5.8 | ○ | ○ | ○ |
| 8 (Present Example) | 150 | 3 | 19 | 7.9 | 80 | 32 | 4.0 | ○ | ○ | ○ |
| 9 (Present Example) | 50 | 3 | 19 | 2.6 | 30 | 40 | 5.0 | ○ | ○ | ○ |
| 10 (Present Example) | 50 | 3 | 19 | 2.6 | 50 | 88 | 11.0 | ◎ | ◎ | ◎ |

FIG. 10B

| Test No. | $d$ (μm) | $a$ (°) | $h'$ (μm) | $d/h'$ | $w$ (μm) | Machining Pocket Quantity | Machining Pocket Quantity Ratio | Machining Pocket Quantity Evaluation | Edge Chipping Evaluation | Judgment |
|---|---|---|---|---|---|---|---|---|---|---|
| 11 (Present Example) | 50 | 3 | 19 | 2.6 | 100 | 92 | 11.5 | ◎ | ◎ | ◎ |
| 12 (Present Example) | 50 | 3 | 19 | 2.6 | 200 | 82 | 10.3 | ◎ | ◎ | ◎ |
| 13 (Present Example) | 50 | 3 | 19 | 2.6 | 300 | 80 | 10.0 | ◎ | ◎ | ◎ |
| 14 (Present Example) | 50 | 3 | 19 | 2.6 | 350 | 40 | 5.0 | ○ | ○ | ○ |
| 15 (Present Example) | 13 | 3 | 5 | 2.6 | 100 | 26 | 3.3 | ○ | ○ | ○ |
| 16 (Present Example) | 20 | 3 | 8 | 2.5 | 100 | 48 | 6.0 | ◎ | ◎ | ◎ |
| 17 (Present Example) | 40 | 3 | 15 | 2.7 | 100 | 86 | 10.8 | ◎ | ◎ | ◎ |
| 18 (Present Example) | 75 | 3 | 30 | 2.5 | 100 | 82 | 10.3 | ◎ | ◎ | ◎ |
| 19 (Present Example) | 90 | 3 | 35 | 2.6 | 100 | 37 | 4.6 | ○ | ○ | ○ |

FIG.11

| Judgment criteria List | Edge chipping evaluation | | |
|---|---|---|---|
| | ◎ | ◎ | × |
| | ◎ | ○ | × |
| | ○ | ○ | × |
| | × | × | × |
| Machining pocket quantity evaluation | ◎ | | |
| | ○ | | |
| | × | | | ium
ROTARY CUTTING TOOL

TECHNICAL FIELD

The present invention relates to a rotary cutting tool, and particularly to a rotary cutting tool suitable for cutting hard, brittle materials.

BACKGROUND ART

Hard, brittle materials such as ceramic, glass, and cemented carbide generate extremely fine chips when cut because of the material characteristics thereof. These fine chips have a high degree of hardness and therefore behave like an abrasive agent, cause chipping of the cutting edge, and promote wear, and are also a primary factor causing chipping ("edge chipping") at an end part of a workpiece.

Therefore, various cutting tools configured to suppress the incidence of edge chipping when cutting hard, brittle materials have been proposed in the past (for example, Patent Document 1).

PRIOR ART DOCUMENTS

Patent Documents

Patent Document 1: JP 2018-8363 A

DISCLOSURE OF INVENTION

Problem to be Solved by the Invention

To eliminate the abovementioned problems when cutting hard, brittle materials, it is conceivable that the feed amount per cutting edge could be increased, and the discharged chips enlarged. However, one property of hard, brittle materials is that brittle fractures easily occur. In addition, if a hard film with some degree of thickness is formed on the surface of a tool for machining a hard, brittle material, roundness at which the effect on cutting performance cannot be disregarded is formed on the edge tip of the tool, sharpness decreases, and cutting resistance increases. Moreover, in order to deal with this increased cutting resistance, a tool shape must inevitably be adopted in which biting of the cutting tool into the workpiece is sacrificed, and emphasis is placed on the rigidity of the edge part. For reasons such as these, chips are not easily enlarged.

In addition, with respect to the cutting of hard, brittle materials, if it is merely that the chips are increased in size, there is a concern that the cutting tool or workpiece could be damaged by biting into chips during cutting. As stated above, chips of hard, brittle materials have a high degree of hardness, and therefore damage due to the biting of chips easily occurs, and in particular, if the to-be-cut material is cemented carbide, the chips themselves are heavy, and thus discharge problems easily occur, and problems occur even if the chips are too large.

Furthermore, as described above, the feed amount per cutting edge of the cutting tool when cutting a hard, brittle material cannot be increased, and under conditions in which the rotational speed (cutting speed) of the cutting tool is increased, wear of the cutting edge is easily promoted, and therefore machining must be implemented at a low machining efficiency, resulting in a problem of an increase in machining time.

Moreover, with conventional cutting tools, in addition to the short cutting tool lifespan, a cutting tool determined to have reached its service life must be replaced multiple times until machining is completed, and due to problems such as these, a significant amount of time is also required for tasks (setup, etc.) outside of actual machining. In addition, if a cutting tool has reached the end of its service life during machining, the cutting tool must be replaced at that time, leading to a concern that a sudden change in quality could occur on the machining surface due to replacement of the cutting tool, and thus many problems currently exist with regard to cutting hard, brittle materials.

In light of the current state, an object of the present invention is to provide a rotary cutting tool that can divide chips at an appropriate size, suppress the incidence of edge chipping and damage attributed to chips to the cutting tool and a workpiece, extend the tool service life with regard to the machining of hard, brittle materials, and improve machining efficiency.

Means for Solving the Problem

The main points of the present invention are described below with reference to the attached drawings.

A first aspect of the present invention relates to a rotary cutting tool having a diamond film 3 coated onto a tip end section of a tool body 1 having a chip discharge groove 2, the rotary cutting tool being characterized in that a rake face 6 is concavely provided in a cutting edge-side chip discharge groove formation surface 4 constituting the chip discharge groove 2 of the tool body 1, from a cutting edge 5 and along the cutting edge 5.

A second aspect of the present invention relates to the rotary cutting tool according to the first aspect, characterized in that the cutting edge-side chip discharge groove formation surface 4 and the rake face 6 are mutually non-parallel, the rake face 6 is configured so as to become an inclined surface separating from the cutting edge-side chip discharge groove formation surface 4, from the cutting edge 5 toward an inside of the tool body 1, and an inclination angle a of the rake face 6 is set to 5° or less.

A third aspect of the present invention relates to the rotary cutting tool according to the first aspect, characterized in that the cutting edge-side chip discharge groove formation surface 4 and the rake face 6 are mutually parallel.

A fourth aspect of the present invention relates to the rotary cutting tool according to the first aspect, characterized in that the cutting edge-side chip discharge groove formation surface 4 is coated with the diamond film 3 having a film thickness h' set from 8 μm to 30 μm, inclusive, and a height d of a level-difference surface 7 connecting the cutting edge-side chip discharge groove formation surface 4 and the rake face 6 is set from 0.5-times to 8-times the film thickness h' of the diamond film 3 at the cutting edge-side chip discharge groove formation surface 4.

A fifth aspect of the present invention relates to the rotary cutting tool according to the second aspect, characterized in that the cutting edge-side chip discharge groove formation surface 4 is coated with the diamond film 3 having a film thickness h' set from 8 μm to 30 μm, inclusive, and a height d of a level-difference surface 7 connecting the cutting edge-side chip discharge groove formation surface 4 and the rake face 6 is set from 0.5-times to 8-times the film thickness h' of the diamond film 3 at the cutting edge-side chip discharge groove formation surface 4.

A sixth aspect of the present invention relates to the rotary cutting tool according to the third aspect, characterized in that the cutting edge-side chip discharge groove formation surface 4 is coated with the diamond film 3 having a film thickness h' set from 8 μm to 30 μm, inclusive, and a height d of a level-difference surface 7 connecting the cutting edge-side chip discharge groove formation surface 4 and the rake face 6 is set from 0.5-times to 8-times the film thickness h' of the diamond film 3 at the cutting edge-side chip discharge groove formation surface 4.

A seventh aspect of the present invention relates to the rotary cutting tool according to the first aspect, characterized in that a tool base material is exposed at a portion or an entirety of the rake face 6.

An eighth aspect of the present invention relates to the rotary cutting tool according to the second aspect, characterized in that a tool base material is exposed at a portion or an entirety of the rake face 6.

A ninth aspect of the present invention relates to the rotary cutting tool according to the third aspect, characterized in that a tool base material is exposed at a portion or an entirety of the rake face 6.

A tenth aspect of the present invention relates to the rotary cutting tool according to the fourth aspect, characterized in that a tool base material is exposed at a portion or an entirety of the rake face 6.

An eleventh aspect of the present invention relates to the rotary cutting tool according to the fifth aspect, characterized in that a tool base material is exposed at a portion or an entirety of the rake face 6.

A twelfth aspect of the present invention relates to the rotary cutting tool according to the sixth aspect, characterized in that a tool base material is exposed at a portion or an entirety of the rake face 6.

A thirteenth aspect of the present invention relates to the rotary cutting tool according to the first aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A fourteenth aspect of the present invention relates to the rotary cutting tool according to the second aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A fifteenth aspect of the present invention relates to the rotary cutting tool according to the third aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A sixteenth aspect of the present invention relates to the rotary cutting tool according to the fourth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A seventeenth aspect of the present invention relates to the rotary cutting tool according to the fifth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A eighteenth aspect of the present invention relates to the rotary cutting tool according to the sixth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A nineteenth aspect of the present invention relates to the rotary cutting tool according to the seventh aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A twentieth aspect of the present invention relates to the rotary cutting tool according to the eighth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A twenty-first aspect of the present invention relates to the rotary cutting tool according to the ninth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A twenty-second aspect of the present invention relates to the rotary cutting tool according to the tenth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A twenty-third aspect of the present invention relates to the rotary cutting tool according to the eleventh aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

A twenty-fourth aspect of the present invention relates to the rotary cutting tool according to the twelfth aspect, characterized in that a level-difference surface 7 connecting the cutting edge-side chip discharge groove formation surface 4 and the rake face 6 is provided at a position separated from the cutting edge 5 by a distance of from 30 μm to 350 μm, inclusive.

Effect of the Invention

The present invention is configured as described above, and therefore provides a rotary cutting tool that can divide chips at an appropriate size, suppress the incidence of edge chipping and damage attributed to chips to the cutting tool and a workpiece, extend the tool service life with regard to the machining of hard, brittle materials, and improve machining efficiency.

BRIEF DESCRIPTION OF THE DRAWINGS

FIG. 4 is an SEM image showing the size of chips of Example 1 and of a conventional product.

FIGS. 5(a) and (b) are schematic explanatory views of a laser irradiation method of Example 1.

FIG. 8 is an explanatory cross-sectional view showing the main parts of the tip end section of the tool body of another example (twisted-edge type) of Example 1.

FIG. 9 is one example of data showing two-dimensional shape measurement results for Example 1.

FIGS. 10A and 10B are tables showing test results for Example 1.

FIG. 11 is a table showing a list of judgment criteria for the test of Example 1.

MODE FOR CARRYING OUT THE INVENTION

Figure 1:
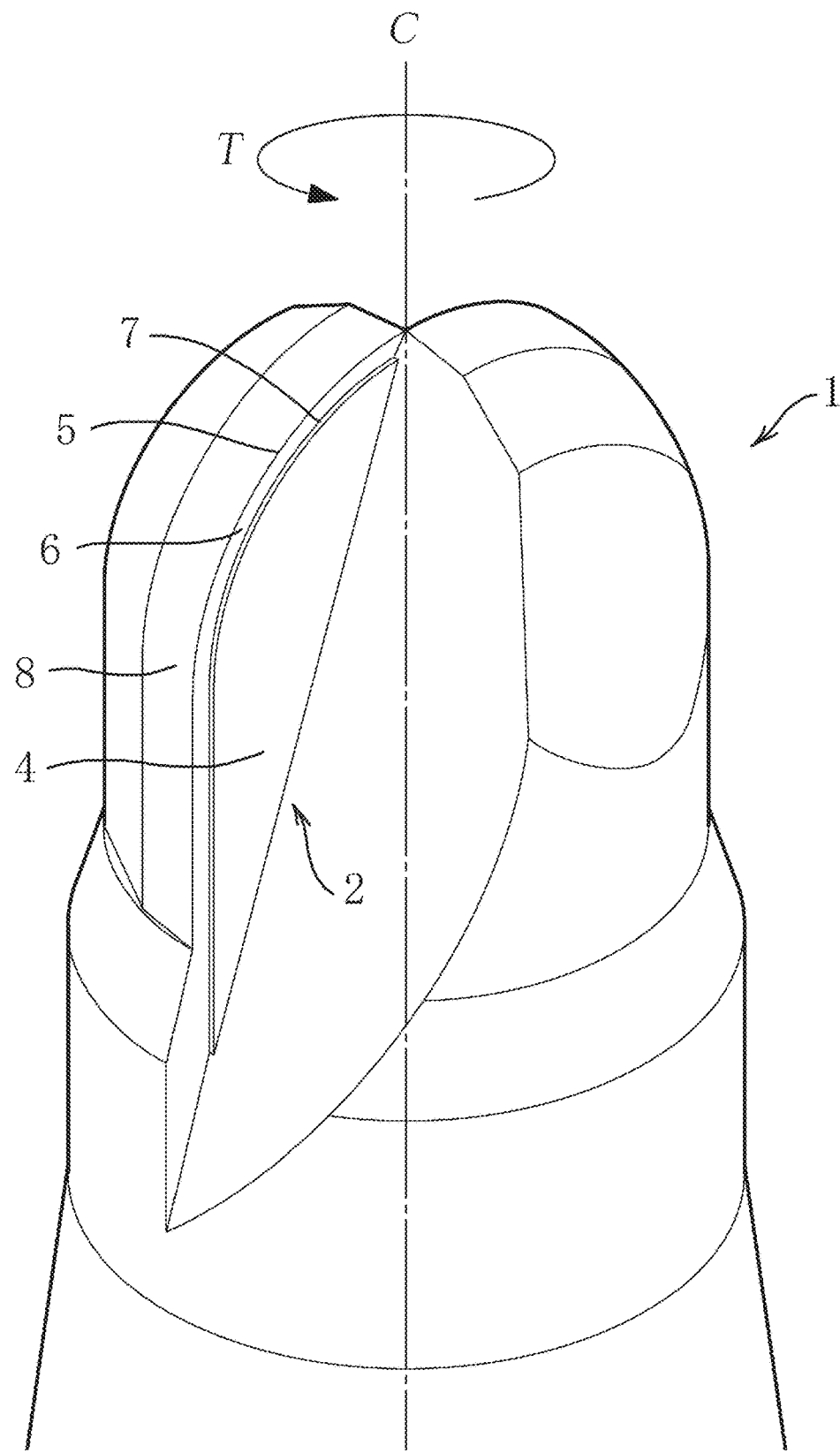
FIG. 1 is a perspective view showing a tip end section of a tool body of an Example 1.

Preferred embodiments of the present invention are briefly described below while presenting the actions of the present invention on the basis of the drawings.

When hard, brittle materials are cut, chips of the hard, brittle material generated through this cutting are continuously (in a connected state) discharged along a rake face 6, and run up onto or run into a level-difference surface 7 (level-difference surface 7 of a stepped portion formed by the rake face 6 and a cutting edge-side chip discharge groove formation surface 4) that is formed when this rake face 6 is concavely provided, and thereby a curled state is strengthened, and with this strengthened curling, stress increases, and the chips are divided.

That is, the present invention can forcedly divide chips discharged along the rake face 6 at an appropriate size by the level-difference surface 7, and by using the rotary cutting tool of the present invention having the level-difference surface 7 provided at an appropriate position, the size of chips that are generated through cutting can be controlled to an appropriate size according to the machining conditions and the type of hard, brittle material to be cut.

As a consequence, the generation of fine chips or overly large chips when, e.g., cutting a hard, brittle material is suppressed, chips divided into an appropriate size are smoothly discharged through an air blowing process, etc., and the occurrence of edge chipping or damage to the workpiece or cutting tool due to the chips is reduced as much as possible, yielding a rotary cutting tool offering exceptional practical utility is achieved.

Example 1

A specific Example 1 of the present invention is described on the basis of FIG. 1 to FIG. 12.

The present example is a rotary cutting tool suitable for cutting hard, brittle materials, the rotary cutting tool having a hard film 3 coated onto a tip end section of a tool body 1 having a chip discharge groove 2, and the rotary cutting tool also having a rake face 6 concavely provided in a cutting edge-side chip discharge groove formation surface 4 constituting the chip discharge groove 2 of the tool body 1, from a cutting edge 5 and along the cutting edge 5.

Figure 2:
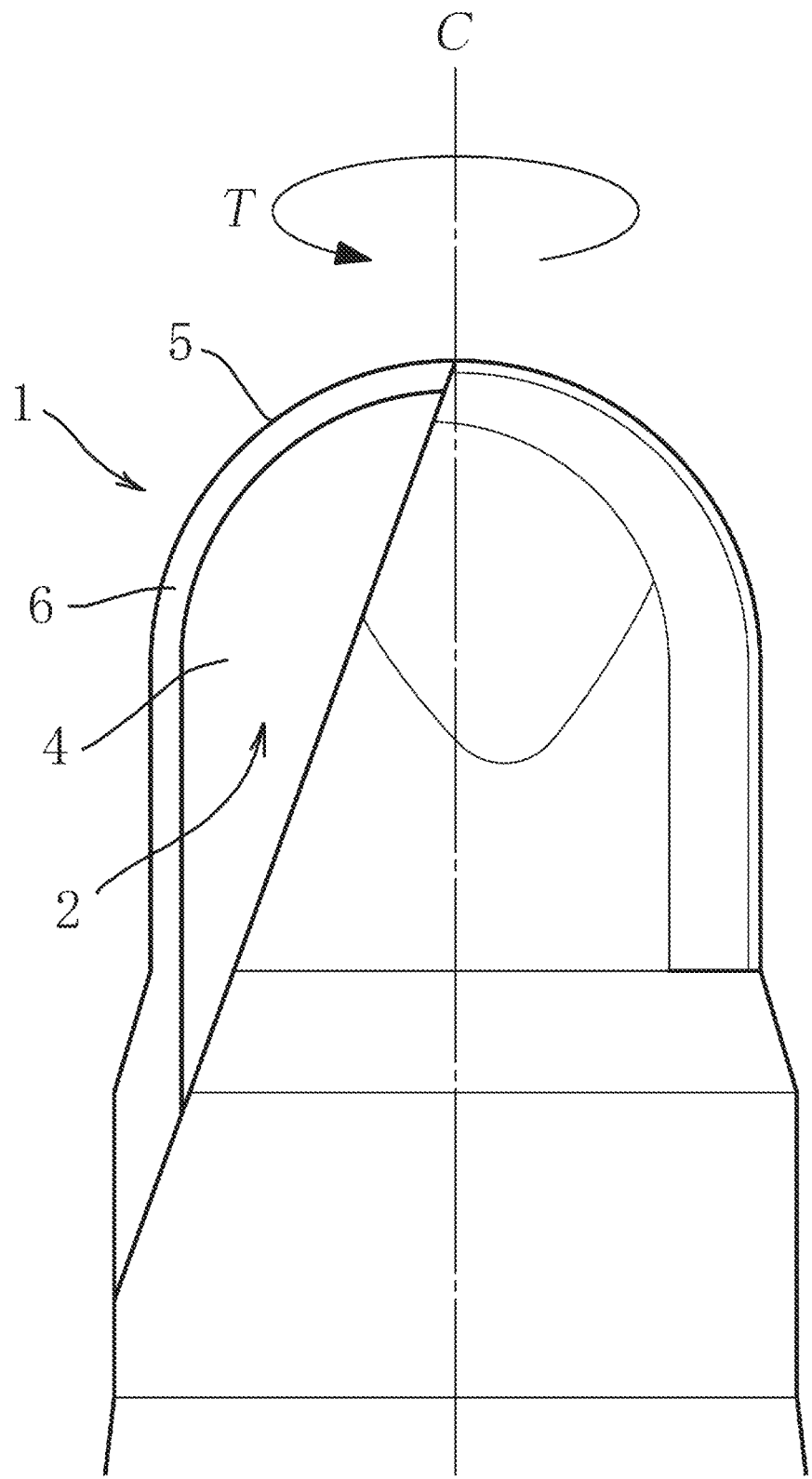
FIG. 2 is a front elevation view showing the tip end section of the tool body of Example 1.

Specifically, the present example is a case in which, as illustrated in FIGS. 1 and 2, the rotary cutting tool of the present invention is configured as a "two-blade ball end mill" having two straight edges, with the chip discharge groove 2 formed linearly in the tool body 1 (the chip discharge groove 2 is not formed in a spiral shape around a tool rotation axis C). In FIGS. 1 and 2, a depiction of the hard film 3 was omitted in order to clarify the shape of the tip end section of the tool body 1 of the present application. In addition, the rotary cutting tool of the present invention can also be applied to other configurations in addition to the abovementioned configuration, including, for example, a multi-blade ball end mill having three or more cutting edges and, as shall be apparent, a single-blade ball end mill having one cutting edge, but also a square end mill or a radius end mill.

Each constituent part pertaining to the present example is described in detail below.

Figure 3:
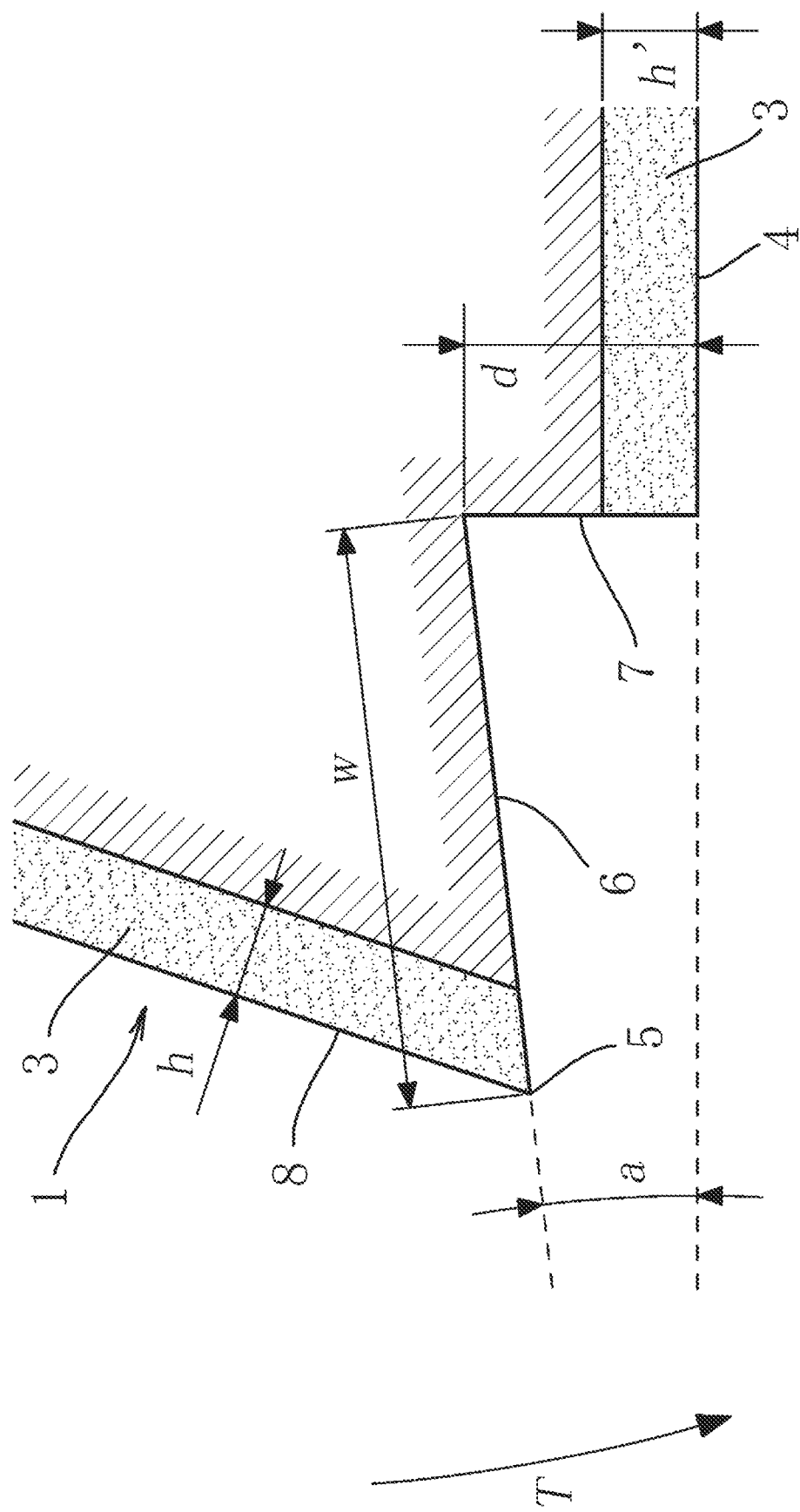
FIG. 3 is an explanatory cross-sectional view showing main parts of the tip end section of the tool body of Example 1.

A base material (tool base material) of the tool body 1 is made of cemented carbide, and as illustrated in FIG. 3, a tip end section (at least a flank face 8) is coated with a hard film 3.

Specifically, in the present example, the hard film 3 is a diamond film 3, and is formed by a CVD method.

Also, with a rotary cutting tool like that of the present example in which the tip end section of the tool body 1 is coated with a diamond film 3, the tool service life depends on a film thickness h of the diamond film 3 on the flank face 8. Ordinarily, when the film thickness h of the diamond film 3 on the flank face 8 becomes less than 5 μm, the progression of film wear accelerates, and the service life tends to be dramatically shortened. In addition, when the film thickness h exceeds 35 μm, in addition to a characteristic of the diamond film 3 of not always exhibiting good adherence with the tool base material made of cemented carbide, ensuring adherence with the tool base material becomes difficult, the risk of issues such as detachment increases, and a stable tool service life is not easily obtained. Because of issues such as these, in the present example, the film thickness h of the diamond film 3 of at least the flank face 8 is set from 5 μm to 35 μm, inclusive. Note that in the present example, the film thickness h of the diamond film 3 of the flank face 8 and a film thickness h' of a diamond film 3 of a below-described cutting edge-side chip discharge groove formation surface 4 are set to nearly equivalent film thicknesses.

Also, as illustrated in FIG. 3, the rake face 6 of the cutting edge 5 is concavely provided in the cutting edge-side chip discharge groove formation surface 4 of the chip discharge groove 2, from the cutting edge 5 and along the cutting edge 5. Accordingly, in the present example, a level-difference surface connecting the rake face 6 and the cutting edge-side chip discharge groove formation surface 4 is provided between this rake face 6 and the cutting edge-side chip discharge groove formation surface 4, and the present example is configured such that chips are divided at an appropriate size by this level-difference surface 7.

Specifically, the rake face 6 is formed by being concavely provided in the cutting edge-side chip discharge groove formation surface 4 so as to become an inclined surface separating from the cutting edge-side chip discharge groove formation surface 4, from the cutting edge 5 towards the inside of the tool body 1, and is configured as a surface that is non-parallel with the cutting edge-side chip discharge groove formation surface 4. In other words, the rake face 6 is formed by being concavely provided in the cutting edge-side chip discharge groove formation surface 4 so as to become an inclined surface that gradually deepens towards the cutting edge-side chip discharge groove formation surface 4, and is configured as a surface that is non-parallel with the cutting edge-side chip discharge groove formation surface 4.

Moreover, if the cutting edge-side chip discharge groove formation surface 4 and the rake face 6 are mutually non-parallel surfaces as in the present example, an angle formed by the two surfaces, that is, the aforementioned inclination angle a of the rake face 6 influences the chips that are discharged through cutting.

Specifically, as the inclination angle a increases, chips cut out from the workpiece are more smoothly discharged from the tip end of the cutting edge 5, along the rake face 6, and towards a tool center side end part of the rake face 6 positioned rearward in the tool rotation direction, and the chips easily strike the level-difference surface 7 concavely provided along with the rake face 6. Thus, a chip dividing action is favorably exhibited by the level-difference surface 7 of the present invention. This favorable action is an action that is observed also with an arc-shaped cutting edge (ball blade) of the cutting edge 5 of a ball end mill, but is more remarkable with regard to chips cut by an outer circumferential cutting edge (outer circumferential blade). In FIG. 3, the tool rotation direction for a case of a cross section orthogonal to the tool rotation axis C is indicated by the arrow to which the reference symbol T has been added. An effect is also exhibited in which the edge tip of the cutting edge 5, which is rounded by being coated with the hard film 3 (diamond film 3), becomes sharper and cutting resistance is reduced. However, on the other hand, the thickness of the cutting edge 5 is reduced, resulting in a decrease in rigidity, and because the edge tip is sharpened, chipping and wear easily occur in the cutting edge 5.

In light of such merits and demerits, in the present example, the inclination angle a of the rake face 6 is set to 5° or less.

Also, as described above, the level-difference surface 7 is provided for the purpose of curling and dividing chips that are continuously discharged along the rake face 6 through cutting.

FIG. 4 shows SEM images of examples of chips produced when cemented carbide, which is a hard, brittle material, was cut with a rotary cutting tool of the present example and with a conventional rotary cutting tool (conventional product) not having a level-difference surface, respectively. FIG. 4 shows that with the conventional product, an overwhelmingly large number of fine chips were produced, whereas with the present example, the number of fine chips was reduced compared to that of the convention product, and the chips were larger.

When a height d of this level-difference surface 7 is too low (when the depth of the step is too shallow), the effect of curling and dividing the chips is reduced, and it becomes difficult to control the chips to an appropriate size. Conversely, when the height d is too high (when the depth of the step is too deep), chips accumulate at the stepped part (near the boundary between the rake face 6 and the level-difference surface 7), causing clogging, etc., and there is a concern that the chips cannot be smoothly discharged. The height d of this level-difference surface 7 is also related to the cutting amount when cutting, and when the level-difference surface 7 is set to an appropriate height d with consideration of these matters, a more favorable effect is obtained.

Specifically, if the workpiece has a high degree of hardness, the cutting amount cannot be increased, and as a result, the thickness of chips is reduced, and thus a tall level-difference surface 7 becomes unnecessary. On the other hand, if the hardness of the workpiece is low, the cutting amount can be increased, and it can be assumed that thick chips will be discharged; therefore, a tall level-difference surface 7 is preferable.

Moreover, when the film thickness h of the diamond film 3 (hard film 3) is increased, the edge tip of the cutting edge 5 coated with this diamond film 3 becomes rounded, leading to an increase in cutting resistance. However, by forming a tall level-difference surface 7, the area of the edge tip of the cutting edge 5 rounded by the diamond film 3 is removed, resulting in an effect of reforming a sharp edge tip.

In consideration of the abovementioned points, the height d of the level-difference surface 7 of the present example is set to a range of 0.5-times to 8-times the film thickness h' of the diamond film 3 coated onto the tip end section of the tool body 1, and specifically, to a range of from 0.5-times to 8-times the film thickness h' of the diamond film 3 coated onto the cutting edge-side chip discharge groove formation surface 4 in which the rake face 6 is concavely provided.

In the present example, chips continuously discharged along the rake face 6 contact the level-difference surface 7 having the height d set in this manner, run up onto the cutting edge-side chip discharge groove formation surface 4, and run into the level-difference surface 7, whereby the chips are curled and divided. However, when the separation interval (distance) of this level-difference surface 7 from the cutting edge 5 is too large, or in other words, when a width w of the rake face 6 is too wide, the level-difference surface 7 does not participate in the division of chips, and the chips continue to elongate without being divided into an appropriate size, and as a result, excessively large chips are generated. Moreover, when the separation interval (distance) of the level-difference surface 7 from the cutting edge 5 is too small, or in other words, when the width w of the rake face 6 is too narrow, chips are divided at a position very near to the edge tip, and therefore numerous chips accumulate in the vicinity of the edge tip, and cause damage to the cutting edge 5 or edge chipping of the workpiece due to biting of the chips.

The level-difference surface 7 of the present example is provided at a position separated from the cutting edge 5 by a distance of 30 μm to 350 μm, inclusive (that is, the width w of the rake face 6 is set from 30 to 350 μm, inclusive), and thus the present invention is configured such that problems like those described above do not occur.

In addition, the rake face 6 and the level-difference surface 7 of the present example are formed by removing a predetermined site of the cutting edge-side chip discharge groove formation surface 4 through laser irradiation.

Specifically, the rake face 6 and the level-difference surface 7 are formed by forming the tool body 1, coating the tip end section of the tool base material with the diamond film 3, and then using an Nd:YVO$_4$ laser to irradiate and remove, from the direction shown in FIGS. 5(a) and (b), a vicinity of the original cutting edge, specifically, the cutting edge-side chip discharge groove formation surface 4 (original rake face) at a predetermined width from the cutting edge and along this cutting edge, along with the diamond film 3.

In FIGS. 5(a) and (b), a depiction of the diamond film 3 is omitted in order to clarify the shape of the tip end section of the rotary cutting tool of the present example. The predetermined site of the cutting edge-side chip discharge groove formation surface 4 may also be ground and removed using a grindstone, etc., in place of the Nd:YVO$_4$ laser.

Thus, the rake face 6 and the level-difference surface 7 of the present example are formed by removing a portion of the cutting edge-side chip discharge groove formation surface 4 through laser irradiation after the diamond film 3 has been applied, and therefore as illustrated in FIG. 3, the present example is configured such that the flank face 8 is coated with the diamond film 3 at the tip end section of the tool body 1, but the rake face 6 and the level-difference surface 7 are not coated with the diamond film 3 (a configuration (state) in which the tool base material is exposed at the entire surface).

Figure 13:
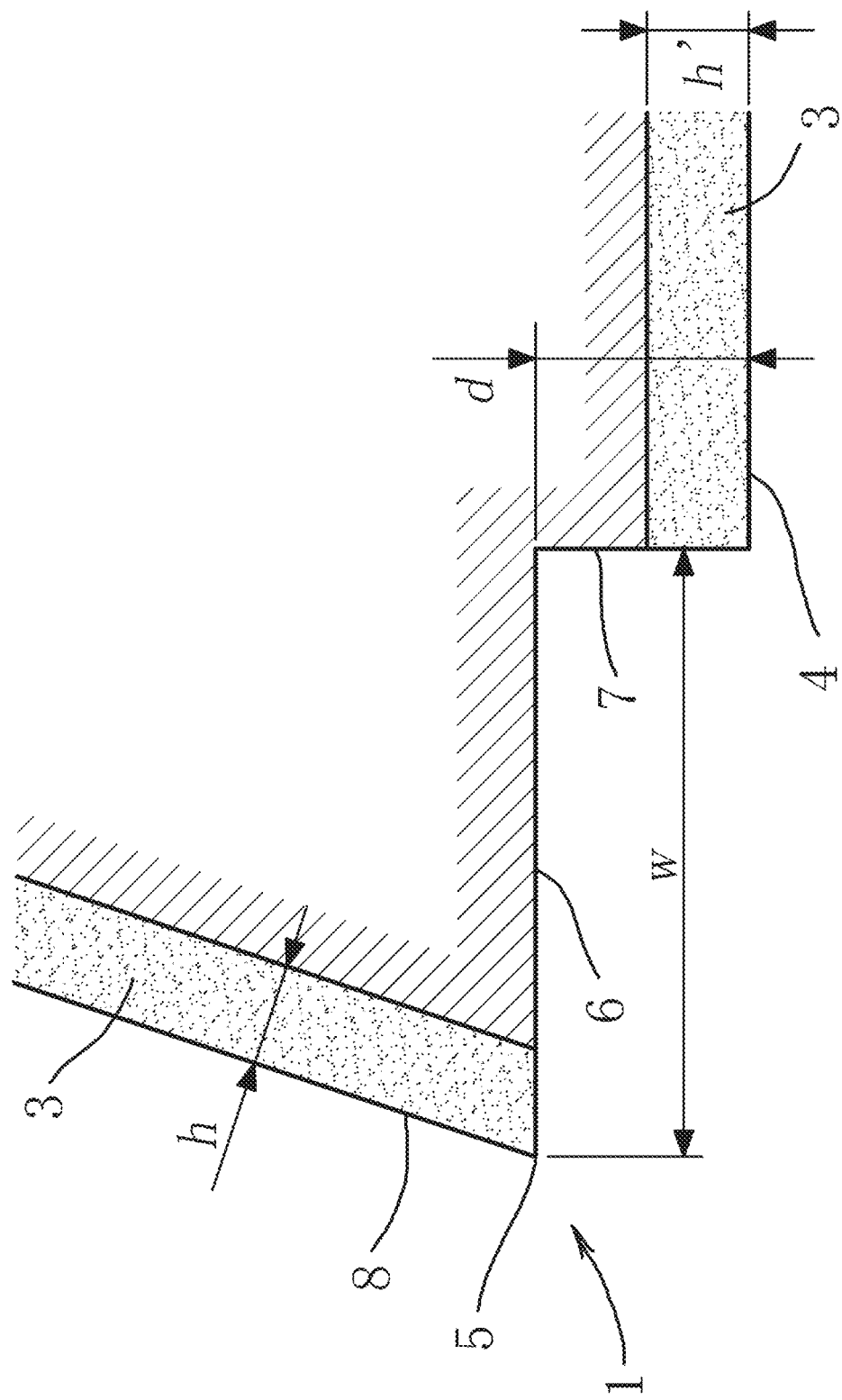
FIG. 13 is an explanatory cross-sectional view showing the main parts of a tip end section of a tool body of an Example 2.

Despite the description being "a configuration (state) in which the tool base material is exposed at the entire surface of the rake face 6", the rake face 6 in the vicinity of the cutting edge 5 is formed by the diamond film 3 in the flank face 8, and therefore it stands to reason that this portion is not "a configuration (state) in which the tool base material is exposed." That is, a configuration (state) not having a portion at which the tool base material is coated by the diamond film 3 at the rake face 6 is referred to as a "configuration (state) in which the tool base material is exposed at the entire surface of the rake face 6." The below-described FIG. 8 and FIG. 13 similarly depict a "configuration (state) in which the tool base material is exposed at the entire surface of the rake face 6."

Figure 6:
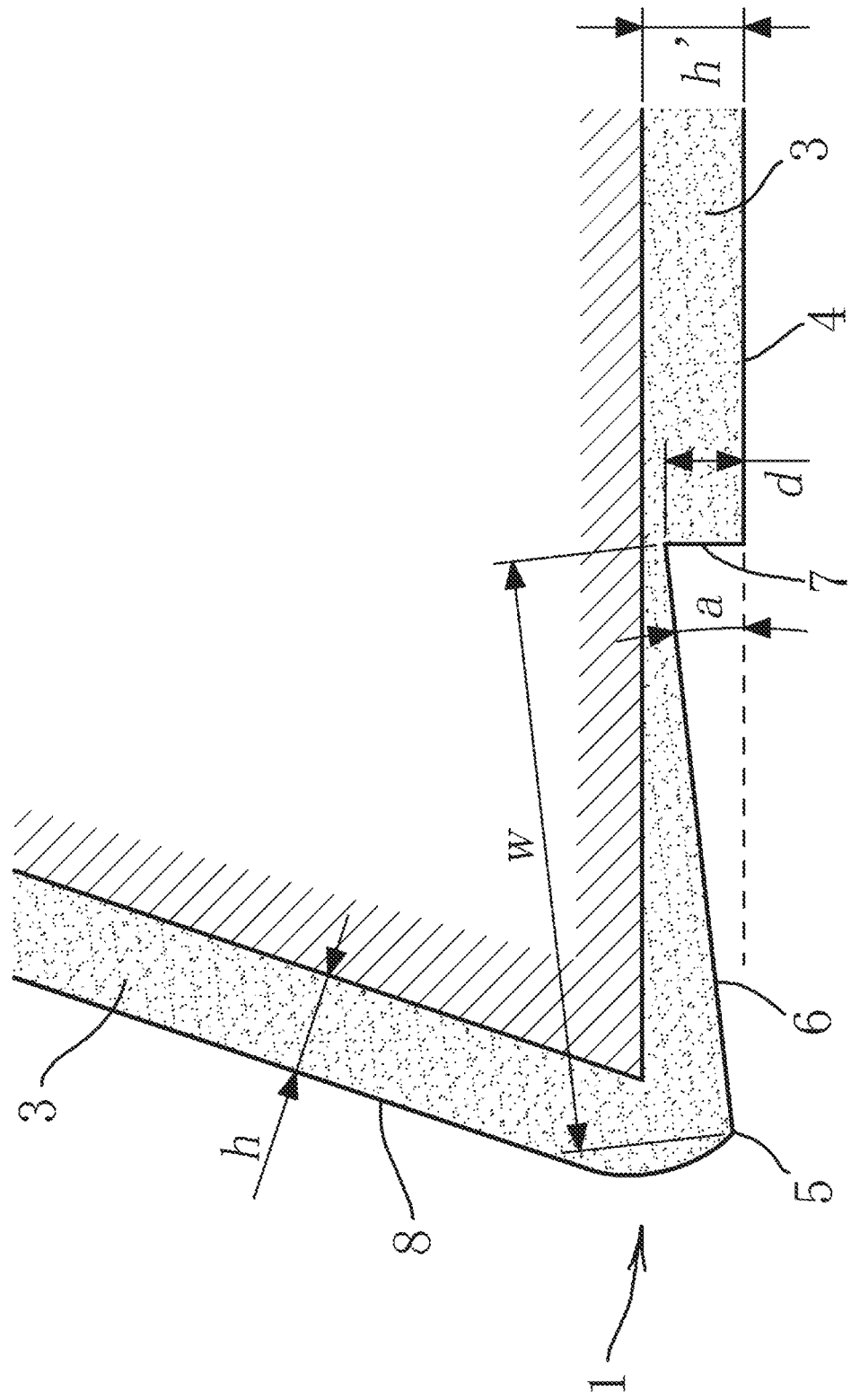
FIG. 6 is an explanatory cross-sectional view showing the main parts of the tip end section of the tool body of another example (configuration in which the entire rake face is coated with a diamond film) of Example 1.
Figure 7:
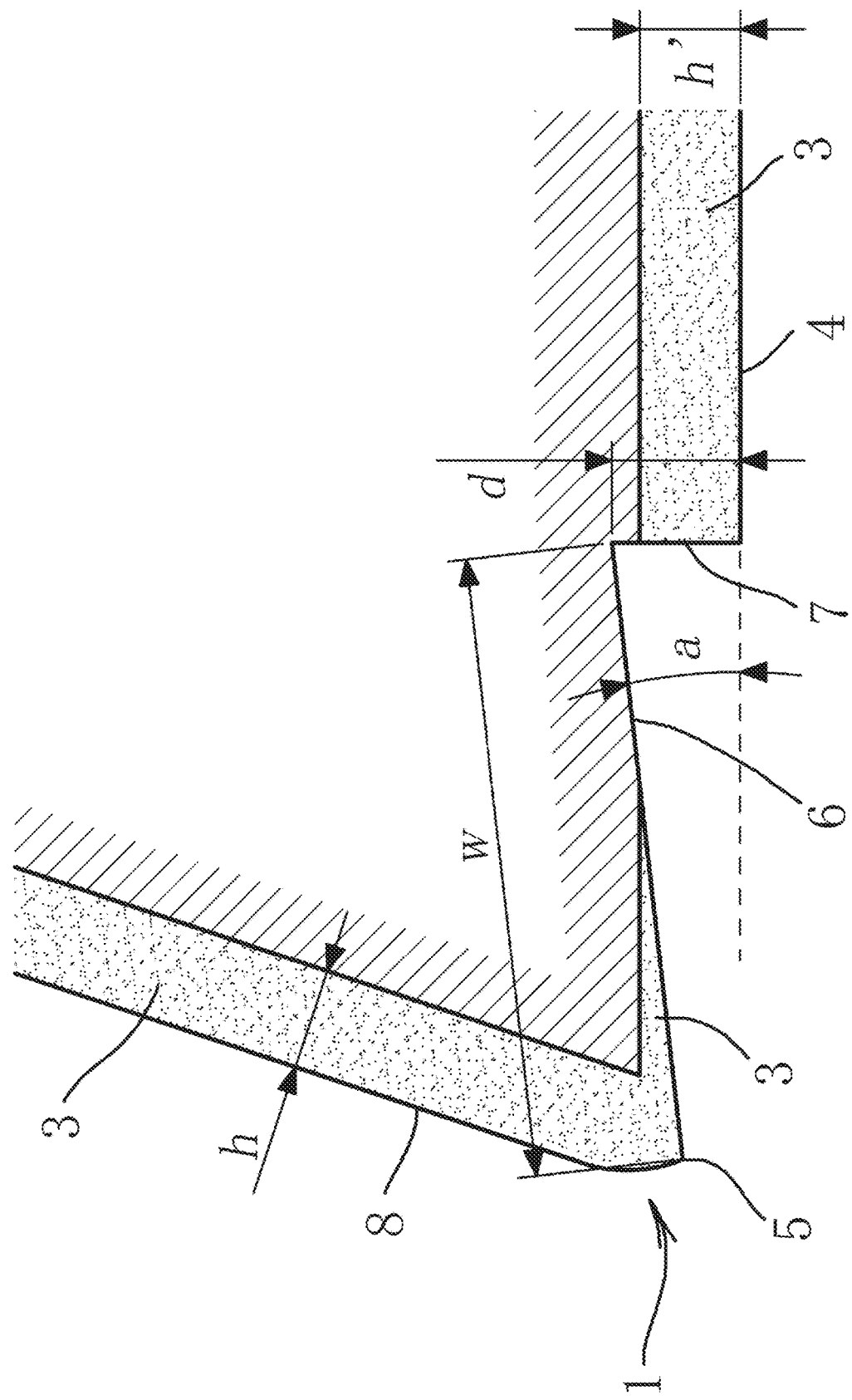
FIG. 7 is an explanatory cross-sectional view showing the main parts of the tip end section of the tool body of another example (configuration in which the tool base material is exposed at a portion of the rake face) of Example 1.

Also, if the configuration is such that the level-difference surface 7 is formed, as shown in FIG. 6, the configuration may be one in which the entire rake face 6 is coated by the diamond film 3, that is, a concavity may be formed in the diamond film 3 coated onto the cutting edge-side chip discharge groove formation surface 4, and this concavity may be used as the rake face 6 and the level-difference surface 7. Alternatively, as shown in FIG. 7, the configuration may be one in which the tool base material is exposed at a portion of the rake face 6, or in other words, the diamond film 3 may be coated onto a portion of the rake face 6.

The present example is configured as a "straight-edge" type rotary cutting tool in which, as described above, the chip discharge groove 2 is not formed in a spiral shape around the tool rotation axis C. However, the present invention is not limited to a straight-edge type, and may also be configured as a "twisted-edge" type in which the chip discharge groove 2 is formed in a spiral edge around the tool rotation axis C.

With the configuration of the twisted-edge type, in particular, a case in which the cutting edge-side chip discharge groove formation surface 4 becomes a curved surface rather than a flat surface exists, and in this case, the cross section thereof becomes a curve like that shown in FIG. 8. If the cutting edge-side chip discharge groove formation surface 4 becomes a curved surface in this manner, the inclination angle a (angle a formed by the cutting edge-side chip discharge groove formation surface 4 and the rake face 6) of the rake face 6 can be determined as, for example, an angle formed between a straight line corresponding to the cutting edge-side chip discharge groove formation surface 4 and a straight line corresponding to the rake face 6. Specifically, the surface shape is acquired as numeric values by measuring the two-dimensional shape in a direction perpendicular to the edge, using the least squares method on an area (curve) of the two-dimensional shape corresponding to the cutting edge-side chip discharge groove formation surface 4 to determine an approximation curve with a quadratic function, etc., using a tangent of the approximation curve at a boundary portion between the cutting edge-side chip discharge groove formation surface 4 and the level-difference surface 7 as a straight line corresponding to the cutting edge-side chip discharge groove formation surface 4, using the least squares method on an area corresponding to the rake face 6 to determine an linear approximation line, using this linear approximation line as a straight line corresponding to the rake face 6, and then determining the inclination angle a as the angle formed by these two straight lines. That is, the angle formed by the two straight lines as determined here is the inclination angle a of the rake face 6, and if this inclination angle a is 0°, the "cutting edge-side chip discharge groove formation surface 4 and the rake face 6 are mutually parallel."

The inclination angle a can also be determined by cutting the tool in the direction perpendicular to the edge, photographing a cross-sectional view thereof, and acquiring the inclination angle a as numeric data through image recognition software, or by manually capturing, as coordinates of an X-Y flat surface, a plurality of arbitrary locations on a curve constituting a cross section of the cutting edge-side chip discharge groove formation surface 4, and then, similar to the description above, determining the inclination angle a as the angle formed between the tangent of the approximation curve and the rake face 6.

The present example is configured as described above, and therefore chips discharged along the rake face 6 can be forcedly curled and divided by the level-difference surface 7. Accordingly, the size of chips produced by cutting can be controlled to an appropriate size by using the rotary cutting tool of the present example for which the width w of the rake face 6 (position of the level-difference surface 7) and the height d of the level-difference surface 7 have been set to appropriate values according to the type of workpiece and the machining conditions.

Through this, for example, when hard, brittle materials are to be cut, the generation of fine chips or overly large chips is suppressed, chips divided into an appropriate size are smoothly discharged through an air blowing process, etc., and the occurrence of edge chipping or damage to the workpiece or cutting tool due to the chips can be reduced as much as possible.

Tests substantiating the effects of the present example are described below.

Two types of tests including an evaluation of the service life and an evaluation of edge chipping were conducted using the present example and a conventional product not having the level-difference surface 7. For the present example, the setting values of each of the various setting conditions including the height d of the level-difference surface 7, the inclination angle a of the rake face 6, the film thickness h' of the diamond film 3 (film thickness h' of the cutting edge-side chip discharge groove formation surface 4), and the width w of the rake face 6 were varied within the respective setting ranges. Details of the machining conditions, machining method, and evaluation method for tests 1 and 2 are as follows.

Test 1 (Evaluation of Service Life Through Rough Machining)
    <Machining Conditions>
    Tool used: Two-blade ball end mill (diameter: 2 mm, edge length: 1.4 mm, shank diameter: 4 mm, total length: 50 mm) with a diamond film 3 coated onto a base material made of cemented carbide Workpiece: Cemented carbide VM-40 (TAS standard)
Coolant: Air blowing
Tool projection amount: 15 mm
Rotational speed: 30,000 rotations/min
Feed speed: 1, 500 mm/min
Cutting depth in axial direction: 0.1 mm
Cutting depth in radial direction: 0.3 mm
<Machining Method>
A square pocket shape measuring 4.4 mm×4.4 mm×depth of 1.2 mm was cut from an upper surface direction of a workpiece.
<Evaluation Method>
The edge tip of the tool was observed each time the machining of one pocket was completed, and when it was confirmed that the diamond film 3 on the flank face 8 adjacent to the cutting edge 5 positioned at an area contacting the workpiece was damaged, and the base material (tool base material) made of cemented carbide was exposed at both of the two edges, it was determined that the end of the service life had been reached, and the number of pockets for which machining was completed was confirmed.

Test 2 (Evaluation of Edge Chipping Through Finishing)
<Machining Conditions>
Tool used: Two-blade ball end mill (diameter: 2 mm, edge length: 1.4 mm, shank diameter: 4 mm, total length: 50 mm) with a diamond film 3 coated onto a base material made of cemented carbide
Workpiece: Cemented carbide VM-40 (TAS standard)
Coolant: Air blowing
Tool projection amount: 15 mm
Rotational speed: 30,000 rotations/min
Feed speed: 1,500 mm/min
Cutting depth in axial direction: 0.05 mm
Cutting depth in radial direction: 0.05 mm
<Machining Method>
An area of a size of 5 mm×5 mm×depth of 0.05 mm (cutting depth amount in axial direction) was cut in an upper surface of a workpiece.
<Evaluation Method>
The state of edge chipping (edge chipping width) at the workpiece ridgeline was confirmed.

Also, in these tests, a shape-analyzing laser microscope (VK-X160 available from Keyence Corporation) was used to measure details such as the height d of the level-difference surface 7, the width w of the rake face 6 (separation interval from the cutting edge 5 to the level-difference surface 7), and the inclination angle a of the rake face 6 (angle a formed between the cutting edge-side chip discharge groove formation surface 4 and the rake face 6). Specifically, the present example was set in a predetermined jig so as to be at a predetermined position and in a predetermined orientation, the profile was detected by a laser in a direction perpendicular to the cutting edge 5 in a range from the flank face 8, through the edge tip of the cutting edge 5, and to the rake face 6, the level-difference surface 7, and the cutting edge-side chip discharge groove formation surface 4, and of this profile, linear approximation lines were drawn (acquired) using the least squares method for both the area corresponding to the cutting edge-side chip discharge groove formation surface 4 and the area corresponding to the rake face 6, and these linear approximation lines were then used to measure (calculate) the inclination angle a of the rake face 6, the height d of the level-difference surface 7, and the width w of the rake face 6 (FIG. 9 shows the two-dimensional shape measurement results of these measurements).

Specifically, the angle formed between the linear approximation line (hereinafter, referred to as a groove formation surface linear approximation line) of the area corresponding to the cutting edge-side chip discharge groove formation surface 4 and the linear approximation line (hereinafter, referred to as a rake face linear approximation line) of the area corresponding to the rake face 6 was measured (calculated) as the inclination angle a of the rake face 6. That is, the angle formed by the two linear approximation lines determined here is the inclination angle a of the rake face 6, and if this inclination angle a is 0°, the "cutting edge-side chip discharge groove formation surface 4 and the rake face 6 are mutually parallel."

Also, as the height d of the level-difference surface 7, a line perpendicular to the groove formation surface linear approximation line was drawn (acquired) from an intersection point between the groove formation surface linear approximation line and the level-difference surface 7 towards the rake face linear approximation line, and the distance to the intersection point between the rake face linear approximation line and the perpendicular line was measured (calculated).

In addition to the above, the present example may be partially fractured (removed) to form a cross section perpendicular to the cutting edge 5, and the inclination angle a, the height d of the level-difference surface 7, and the width w of the rake face 6 may be measured on this cross section. Also, if a method in which a profile according to the two-dimensional shape measurements is adopted, as described above, even if the cutting edge-side chip discharge groove formation surface 4 exemplified in FIG. 8 becomes a curved surface, the tangent of the approximation curve (namely, the tangent of the approximation curve at the boundary portion between the cutting edge-side chip discharge groove formation surface 4 and the level-difference surface 7, obtained by using the least squares method on the area (curve) corresponding to the cutting edge-side chip discharge groove formation surface 4 to determine the approximation curve with a quadratic function, etc.) is used as the groove formation surface linear approximation line, and similarly, the inclination angle a, the height d of the level-difference surface 7, and the width w of the rake face 6 can be measured (calculated).

FIGS. 10A and 10B are tables showing the various setting conditions and each of the evaluations with respect to the present example and the conventional product. Evidence of the effects of the present example is explained on the basis of the test results shown in FIG. 10.

Figure 12:
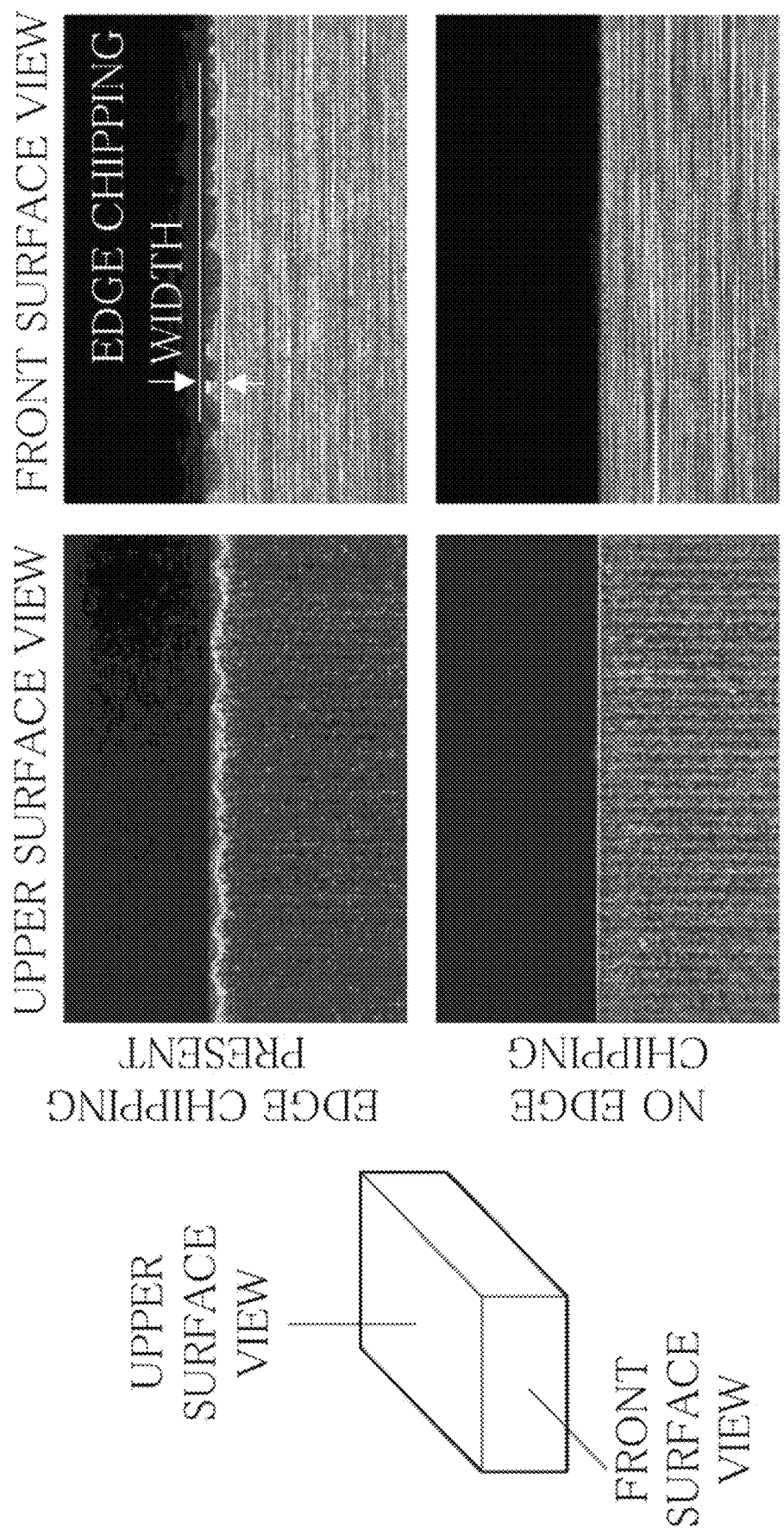
FIG. 12 presents photographs of machining surfaces of a workpiece of the tests of Example 1.

Note that in FIGS. 10A, 10B, and 11, the evaluation of the machining pocket quantity is indicated on a basis of the machining quantity of the conventional product (Test No. 1), and a machining pocket quantity of 6-times or greater is indicated by ⊚, a machining pocket quantity of from 3-times to less than 6-times is indicated by ○, and a machining quantity of less than 3-times is indicated by x. Also, as shown in FIG. 12, edge chipping was evaluated in a direction orthogonal to the workpiece ridgeline in a front surface view and an upper surface view (flat surface view) of the workpiece, and an edge chipping width of less than 0.05 mm is indicated by ⊚, an edge chipping width of from 0.05 mm to less than 0.1 mm is indicated by ○, and an edge chipping width of 0.1 mm or greater is indicated by x.

In contrast with the conventional product (Test No. 1) without a level-difference surface 7, in the present example, when the width w of the rake face 6 and the inclination angle a of the rake face 6 were fixed, and only the height d of the level-difference surface 7 was changed, the pocket quantity that could be machined with a scaling factor (d/h') in a range of from 0.5-times to 8-times, inclusive, was numerous (the service life was long), and thus favorable evaluation results were obtained. The scaling factor thereof is a ratio of the height d of the level-difference surface 7 to the film thickness h' of the diamond film 3 coated onto the cutting edge-side chip discharge groove formation surface 4. Among this scaling factor range, particularly favorable evaluation results were obtained when the scaling factor was in a range of greater than 1-times but less than 3-times, and the maximum machinable pocket quantity was obtained in these tests when the scaling factor was 2.6-times.

While not depicted in FIGS. 10A and 10B, it was confirmed that clogging with chips was caused when the scaling factor of the level-difference surface 7 to the film thickness h' of the diamond film 3 coated onto the cutting edge-side chip discharge groove formation surface 4 was excessively large, and that as a result, the machinable pocket quantity decreased. It was also confirmed that, conversely, if the scaling factor was overly small, the effect of the level-difference surface 7 was not sufficiently exhibited, and the machinable pocket quantity decreased. Also, as described above, in comparison to the conventional product, favorable evaluation results were obtained under a condition in which the height d of the level-difference surface 7 was less than the film thickness h' of the diamond film coated onto the cutting edge-side chip discharge groove formation surface 4 (Test No. 2: scaling factor (d/h')=0.5). However, the machinable pocket quantity was the lowest amongst the other compared conditions (Test Nos. 3, 5, 7, 8). It is thought that one reason for this is that Test No. 2 was a state in which the rake face 6 remained covered with the diamond film 3, and therefore the diamond film 3 was damaged during machining, the impact therefrom was transmitted over a wide range of the cutting edge 5, and thereby damage easily progressed. That is, it was possible to confirm that a condition in which the rake face 6 is not coated with the diamond film 3 (condition in which the rake face 6 is exposed) is preferable.

Also, a rounded area is formed by the diamond film 3 at the intersecting ridgeline part between the rake face 6 and the flank face 8, but as the height d of the level-difference surface 7 increases, this rounded area is also removed and made smaller. Through this, an effect of reducing cutting resistance and improving the biting of the cutting edge 5 into the workpiece is obtained; therefore, as shown in FIGS. 10A and 10B, the edge chipping evaluation was favorable (Test Nos. 2, 3, 5, 7, 8).

Also, when the height d of the level-difference surface 7 and the width w of the rake face 6 were fixed, and only the inclination angle a of the rake face 6, that is, the angle formed between the cutting edge-side chip discharge groove formation surface 4 and the rake face 6 was changed, a maximum machinable pocket quantity was obtained when the inclination angle a was 3°.

Also, in Test No. 4 as well, which, similar to the conventional product of Test No. 1, had an inclination angle a of 0°, the machining pocket quantity ratio was 6.3, and thus a favorable result was exhibited. A favorable result was also obtained for edge chipping. Even though the inclination angle a was 0°, the evaluations of the machining pocket quantity and edge chipping showed improvements compared to the conventional product because the level-difference surface 7 was provided, and thus chips were curled and divided, and because the area of the edge tip of the cutting edge 5 that was rounded by the diamond film 3 was removed, and thus sharpness was improved. In addition, even in a case in which the inclination angle a of the rake face was further reduced (−3°: inclined in a direction opposite that of the present example, that is, inclined so as to draw nearer to the cutting edge-side chip discharge groove formation surface 4 moving from the cutting edge 5 toward the inside of the tool body 1) or further increased (7°, 10°), more favorable results were obtained in both the machining pocket quantity and edge chipping evaluations compared to the conventional product, but it was confirmed that the results obtained with the present example, that is, the results that were obtained when the inclination angle a was from 0° to 5°, inclusive, were particularly favorable (Tests Nos. 4-6). The matter of the "inclination angle a was 0°" was, as described in Example 2 below, a case in which the cutting edge-side chip discharge groove formation surface 4 and the rake face 6 were formed as mutually parallel surfaces.

Also, when the height d of the level-difference surface 7 and the inclination angle a of the rake face 6 were fixed, and only the width w of the rake face 6 was changed, favorable results that were superior to those of the conventional product were obtained in a width w range of the rake face 6 of from 30-350 µm, inclusive, in both the machining pocket quantity and edge chipping evaluations, which indicate the service life, and within this width w range, particularly favorable results were exhibited when the width w was set to a range of 50-300 µm, inclusive.

When the width w of the rake face 6 is too wide, the function of curling and dividing chips is no longer exhibited, the chips are not smoothly discharged, and as a result, tool damage easily occurs due to biting into large chips. Conversely, when the width w of the rake face 6 is too narrow, curling and dividing of chips occurs in the vicinity of the cutting edge, and therefore biting of chips is instead induced, and as a result, tool damage and workpiece damage progress. Therefore, the width w of the rake face 6 is preferably set to the range described above (Test Nos. 5, 9-14).

An evaluation was also conducted in which the height d of the level-difference surface 7, the inclination angle a of the rake face 6, and the width w of the rake face 6 were fixed at the optimal values examined as described above, and the film thickness h' of the diamond film 3 of the cutting edge-side chip discharge groove formation surface 4 was varied. Here, an end mill was used in which the scaling factor of the height d of the level-difference surface 7 to the film thickness h' of the diamond film coated onto the cutting edge-side chip discharge groove formation surface 4 was approximately 2.6, which is the scaling factor at which the machinable pocket quantity was most favorable in the previously implemented tests with regard to the height d of the level-difference surface 7. With those tools having a film thickness h' in a range of from 5 µm to 35 µm, inclusive, the machinable pocket quantity was high (the service life was long), and the results from the edge chipping evaluation were also favorable (Test Nos. 15-19).

In addition, when the film thickness h' ranged from 8 µm to 30 µm, inclusive, extremely favorable results were obtained in the machinable pocket quantity and edge chipping evaluations (Test Nos. 16-18). It is thought that this was because the film thickness h (h') of the diamond film 3, which is an important element in the machining of hard, brittle materials, was thick, and thereby the removal volume of workpiece that was cut until wearing of the film occurred increased, and early-stage tool damage was suppressed even in finishing such as that in the edge chipping evaluation. Therefore, setting the film thickness h' to a range of from 8 µm to 30 µm, inclusive is particularly preferable.

For a case in which the film thickness h' was less than 5 µm, it was confirmed that the film thickness h of the flank face was also low; i.e., about the same level. Therefore the diamond film 3 was easily damaged (worn) when cutting, and the machinable pocket quantity (9-12) did not vary much from that of the conventional product. It was also confirmed the edge chipping evaluation results were also equivalent to that of the conventional product. Adhesion of the diamond film 3 to the tool base material decreases relative to the cutting resistance, and therefore when the film thickness h' exceeded 35 μm, tool damage (peeling) occurred at an early stage, and it was confirmed that the machinable pocket quantity did not vary much from that of the conventional product (quantity of 7-12), and that the edge chipping evaluation results were also equivalent to that of the conventional product.

Example 2

Figure 14:
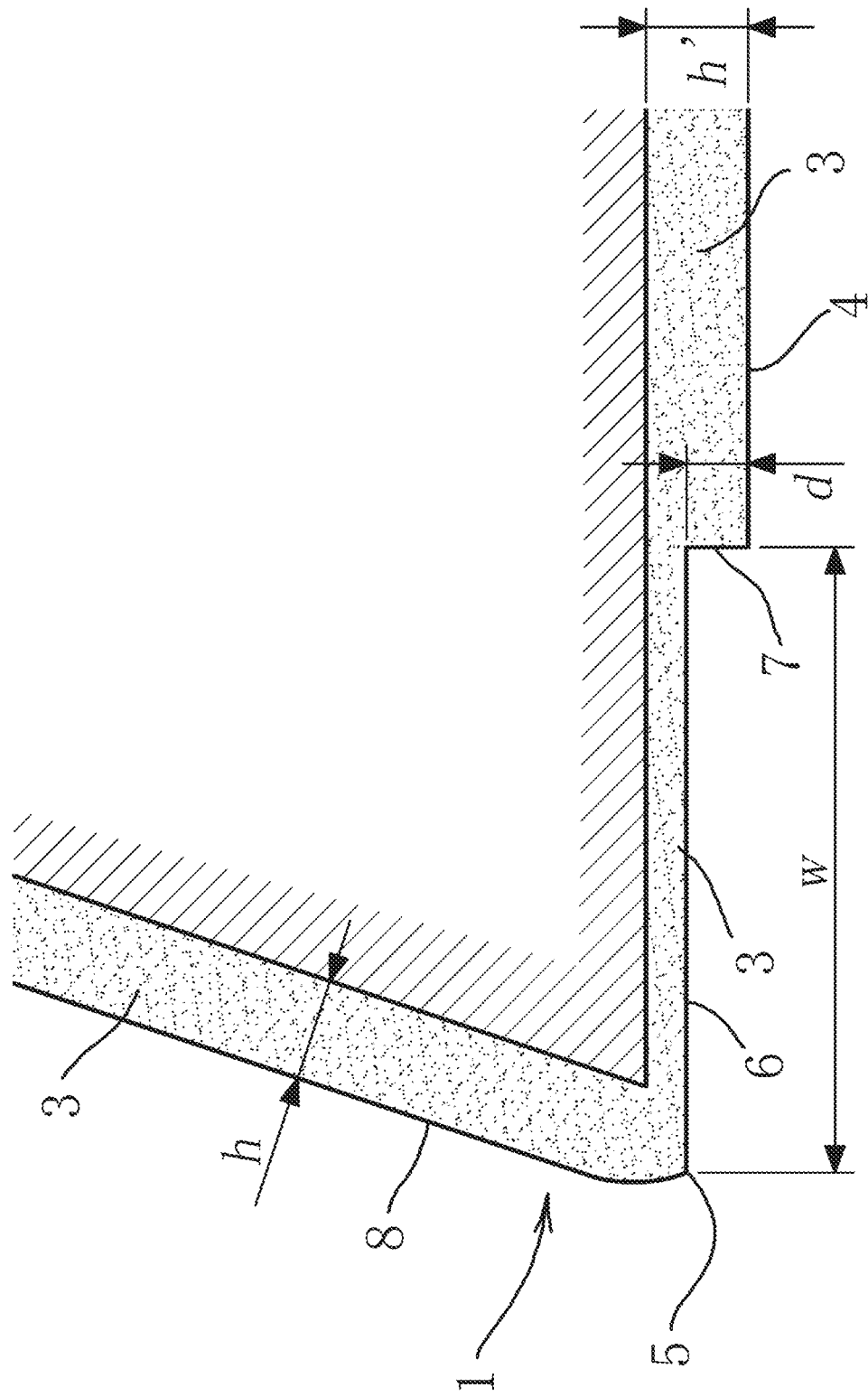
FIG. 14 is an explanatory cross-sectional view showing the main parts of the tip end section of the tool body of another example (configuration in which the entire rake face is coated with a diamond film) of Example 2.

A specific Example 2 of the present invention is described on the basis of FIGS. 13 and 14.

The present example is a case in which the inclination angle a of the rake face 6 of the rotary cutting tool in Example 1 is set to 0°, or in other words, the present example is a case in which the cutting edge-side chip discharge groove formation surface 4 and the rake face 6 are formed in mutually parallel surfaces.

As shown in FIGS. 13 and 14, the same effect as that of Example 1 described above is exhibited for the case in which the inclination angle a of the rake face 6 is set to 0° (including both a configuration in which the tool base material is exposed at the entire surface of the rake face 6 and a configuration in which the entire surface of the rake face 6 is coated with the diamond film 3). Note that Test No. 4 in FIGS. 10A and 10B is the configuration of Example 2 shown in FIG. 13 (configuration in which the tool base material is exposed at the entire surface of the rake face 6), and the results indicate that a favorable effect is exhibited.

The present invention is not limited to Examples 1 and 2, and the specific configurations of each constituent requirement can be designed, as appropriate.

The invention claimed is:

1. A rotary cutting tool, comprising:
   a tool body including a tip end section having a chip discharge groove, the tool body extending along a rotational axis in a first direction from a machining end towards a shank end,
   a diamond film coated onto the tip end section of the tool body;
   a cutting edge extending along the first direction, the cutting edge defining a rake face therewith; and
   a cutting edge-side chip discharge groove formation surface constituting the chip discharge groove of the tool body;
   wherein the rake face is concavely provided in the cutting edge-side chip discharge groove formation surface, so as to generate a single and continuous stepped level-difference surface directly connecting the cutting edge-side chip discharge groove formation surface and the rake face;
   wherein the rake face intersects a cutting edge and directly extends from the cutting edge towards the single and continuous stepped level-difference surface; and
   wherein the rake face and the single and continuous stepped level difference surface extend continuously and uninterrupted along at least an entirety of the cutting edge in the first direction.

2. The rotary cutting tool according to claim 1, characterized in that the cutting edge-side chip discharge groove formation surface and the rake face are mutually non-parallel, the rake face is configured so as to become an inclined surface separating from the cutting edge-side chip discharge groove formation surface, from the cutting edge toward an inside of the tool body, and an inclination angle of the rake face is set to 5° or less.

3. The rotary cutting tool according to claim 1, characterized in that the cutting edge-side chip discharge groove formation surface and the rake face are mutually parallel.

4. The rotary cutting tool according to claim 1, characterized in that the cutting edge-side chip discharge groove formation surface is coated with the diamond film having a film thickness set from 8 μm to 30 μm, inclusive, and a height of the single and continuous stepped level-difference surface connecting the cutting edge-side chip discharge groove formation surface and the rake face is set from 0.5-times to 8-times the film thickness of the diamond film at the cutting edge-side chip discharge groove formation surface.

5. The rotary cutting tool according to claim 2, characterized in that the cutting edge-side chip discharge groove formation surface is coated with the diamond film having a film thickness set from 8 μm to 30 μm, and a height of the single and continuous stepped level-difference surface connecting the cutting edge-side chip discharge groove formation surface and the rake face is set from 0.5-times to 8-times the film thickness of the diamond film at the cutting edge-side chip discharge groove formation surface.

6. The rotary cutting tool according to claim 3, characterized in that the cutting edge-side chip discharge groove formation surface is coated with the diamond film having a film thickness set from 8 μm to 30 μm, and a height of the single and continuous stepped level-difference surface connecting the cutting edge-side chip discharge groove formation surface and the rake face is set from 0.5-times to 8-times the film thickness of the diamond film at the cutting edge-side chip discharge groove formation surface.

7. The rotary cutting tool according to claim 1, characterized in that a tool base material is exposed at a portion or an entirety of the rake face.

8. The rotary cutting tool according to claim 2, characterized in that a tool base material is exposed at a portion or an entirety of the rake face.

9. The rotary cutting tool according to claim 3, characterized in that a tool base material is exposed at a portion or an entirety of the rake face.

10. The rotary cutting tool according to claim 4, characterized in that a tool base material is exposed at a portion or an entirety of the rake face.

11. The rotary cutting tool according to claim 5, characterized in that a tool base material is exposed at a portion or an entirety of the rake face.

12. The rotary cutting tool according to claim 6, characterized in that a tool base material is exposed at a portion or an entirety of the rake face.

13. The rotary cutting tool according to claim 1, characterized in that the single and continuous stepped level-difference surface connecting the cutting edge-side chip discharge groove formation surface and the rake face is provided at a position separated from the cutting edge by a distance of from 30 μm to 350 μm.

14. The rotary cutting tool according to claim 2, characterized in that the single and continuous stepped level-difference surface connecting the cutting edge-side chip discharge groove formation surface and the rake face is provided at a position separated from the cutting edge by a distance of from 30 μm to 350 μm.

15. The rotary cutting tool according to claim 3, characterized in that the single and continuous stepped level-difference surface connecting the cutting edge-side chip discharge groove formation surface and the rake face is provided at a position separated from the cutting edge by a distance of from 30 μm to 350 μm.

16. The rotary cutting tool according to claim 4, characterized in that the single and continuous stepped level-difference surface connecting the cutting edge-side chip discharge groove formation surface and the rake face is provided at a position separated from the cutting edge by a distance of from 30 μm to 350 μm.

17. The rotary cutting tool according to claim 5, characterized in that the single and continuous stepped level-difference surface connecting the cutting edge-side chip discharge groove formation surface and the rake face is provided at a position separated from the cutting edge by a distance of from 30 μm to 350 μm.

18. The rotary cutting tool according to claim 6, characterized in that the single and continuous stepped level-difference surface connecting the cutting edge-side chip discharge groove formation surface and the rake face is provided at a position separated from the cutting edge by a distance of from 30 μm to 350 μm.

19. The rotary cutting tool according to claim 7, characterized in that the single and continuous stepped level-difference surface connecting the cutting edge-side chip discharge groove formation surface and the rake face is provided at a position separated from the cutting edge by a distance of from 30 μm to 350 μm.

20. The rotary cutting tool according to claim 8, characterized in that the single and continuous stepped level-difference surface connecting the cutting edge-side chip discharge groove formation surface and the rake face is provided at a position separated from the cutting edge by a distance of from 30 μm to 350 μm.

21. The rotary cutting tool according to claim 9, characterized in that the single and continuous stepped level-difference surface connecting the cutting edge-side chip discharge groove formation surface and the rake face is provided at a position separated from the cutting edge by a distance of from 30 μm to 350 μm.

22. The rotary cutting tool according to claim 10, characterized in that the single and continuous stepped level-difference surface connecting the cutting edge-side chip discharge groove formation surface and the rake face is provided at a position separated from the cutting edge by a distance of from 30 μm to 350 μm.

23. The rotary cutting tool according to claim 11, characterized in that the single and continuous stepped level-difference surface connecting the cutting edge-side chip discharge groove formation surface and the rake face is provided at a position separated from the cutting edge by a distance of from 30 μm to 350 μm.

24. The rotary cutting tool according to claim 12, characterized in that the single and continuous stepped level-difference surface connecting the cutting edge-side chip discharge groove formation surface and the rake face is provided at a position separated from the cutting edge by a distance of from 30 μm to 350 μm.

* * * * *